United States Patent Office 2,696,453
Patented Dec. 7, 1954

2,696,453

EMULSIFIERS AND TOXICANTS CONTAINING THE SAME

Herbert L. Sanders, Edward A. Knaggs, and Marvin L. Nussbaum, Chicago, Ill.

No Drawing. Application May 27, 1952,
Serial No. 290,334

24 Claims. (Cl. 167—30)

This invention relates to emulsions for use for agricultural and livestock purposes and is especially concerned with improvements in emulsifier compositions and emulsifiable toxicant-containing concentrates which utilize said emulsifier compositions.

In the past several years, various toxicants for use for agricultural and livestock purposes, for example, as insecticides, herbicides, fungicides, rodenticides, disinfectants, germicides and weed killers have come into substantial use replacing, to a considerable extent, the older types of materials such as lime-sulfur, lead arsenate, various copper compounds, nicotine and the like. Among these more modern agents are, for example, DDT, benzene hexachloride, hexamethyl tetraphosphate, benzyl benzoate, dimethyl phthalate, Parathion, tetraethyl pyrophosphate, 2,4–D, methoxychlor, alpha-naphthyl thiourea, "Aldrin" (1,2,3,4,10,10-hexachloro-1,4,4a,5,8,8a-hexahydro - 1,4 - endo, exo-5,8-dimethanonaphthalene), "Dieldrin" (1,2,3,4,10,10-hexachloro-6,7-epoxy,1,4,4a,5,-6,7,8,8a - octahydro-1,4-endo, exo-5,8-dimethanonaphthalene), "Lindane" (gamma isomer of benzene hexachloride), "Toxaphene" (a chlorinated camphene which, in 100% form, contains about 67%, by weight, of chlorine), "Chlordane" (empirical formula $C_{10}H_6Cl_8$, and apparently 5,8- endo-dichloro-methylene-4-0-dihydro-2,3,-5,6,7,8-hexachloro endane), and the like. Such toxicants are conventionally admixed with emulsifying agents and organic solvents to form concentrates which, in use, are added to water to form emulsions which are sprayed or otherwise applied to the surface of the plants, weeds, animals or insects to be treated.

Numerous types of emulsifying agents have been suggested and employed for the above purposes, typical of such agents being monoglycerides and diglycerides of rosin acids and higher molecular weight fatty acids; polyoxyalkylene ethers of alkyl phenols as, for example, polyoxyethylene ethers of di-isobutyl phenol; partial esters of rosin acids and higher molecular weight fatty acids with hexitol anhydrides such as sorbitan mono-oleate, sorbitan trioleate, and the like; sodium alkylnaphthalene sulfonates, sodium tetrahydronaphthalene sulfonate, sodium salts of aryl alkyl polyether sulfonates, sodium salts of alkylated aromatic sulfonates, and the like; polyoxyethylene derivatives of hexitol anhydrides partially esterified with rosin acids and higher molecular weight fatty acids, such as polyoxyethylene sorbitan mono-oleate, polyoxyethylene sorbitan monostearate, and the like. Such emulsifying agents are, generally speaking, reasonably effective in various formulations and under particular conditions. However, they tend to lack certain versatility and have a number of other objections with which those versed in the art are familiar.

In accordance with the present invention, substantially improved emulsifiers or emulsifying compositions have been evolved, being particularly effective when utilized in conjunction with toxicants such as toxaphene, DDT, and the like. Such toxicant concentrates form good emulsions by simple addition to water, requiring little or no agitation, and stable emulsions are obtained not only with soft water but, at least as well, in most cases, with hard water and also water containing substantial amounts of electrolytes, for example, sea water.

The emulsifying compositions utilized in accordance with the present invention comprise mixtures of at least two ingredients, hereafter described in detail. Supplemental ingredients may, if desired, be added but they are not essential so far as the present invention is concerned.

The first of the two essential ingredients comprises a non-ionic emulsifier of the type which is a derivative of a polyglycol, particularly a polyoxyethylene glycol or polyoxypropylene glycol, especially the former, the number of oxyalkylene groups present ranging, generally speaking, from about an average of 4 to as high as 60 or more. In the preferred embodiments of the invention, the polyglycol portion of the molecule should contain from about 8 to about 20 oxyalkylene groups, especially, as stated above, oxyethylene groups. From a molecular weight standpoint, the polyoxyethylene glycol radical of the non-ionic emulsifying agents advantageously ranges from a molecular weight between about 200 and about 6000, with molecular weights of about 300 to about 1000 being preferred in most cases. Some of them are conventionally prepared by reacting, for example, a higher molecular weight acid such as lauric acid or oleic acid, or a higher molecular weight alcohol such as lauryl or oleyl alcohol, or a higher molecular weight aliphatic or fatty mercaptan such as lauryl mercaptan, or a higher molecular weight aliphatic amine such as lauryl amine or oleyl amine or stearyl amine, or a higher molecular weight aliphatic carboxylic amide such as lauramide or the lauric acid amide of monoethanolamine, with ethylene oxide to introduce the desired number of oxyethylene groups. Others are made by reacting a phenol or a naphthol or an alkylated isocyclic hydroxyl compound such as an alkylated phenol or naphthol, particularly where the alkyl group contains from about 4 and especially from 8 to 18 carbon atoms, with ethylene oxide to introduce the requisite number of oxyethylene groups. Such products are available on the market under a variety of trade-marks and their method of preparation is well known. It is particularly desirable to utilize those which are water-soluble or water-dispersible. Typical examples which are useful as one of the constituents of the emulsifying compositions made in accordance with the present invention are as follows:

"Tweens" which are fatty acid mono-esters of anhydro sorbitols which have been solubilized by etherification of the free hydroxyl groups with ethylene oxide. The fatty acid portion of the molecule is commonly derived from lauric acid, palmitic acid, oleic acid, and stearic acid, or mixtures thereof. The number of oxyethylene groups varies within appreciable limits. Typical of such "Tweens" are those sold under the name "Tween 20," which is a polyethylene glycol ether of sorbitan mono-laurate; "Tween 60," which is a polyethylene glycol ether of sorbitan mono-stearate; and "Tween 80" which is a polyethylene glycol ether of sorbitan monooleate.

A number of the products sold under the name "Tritons" are likewise effective for use in the practice of the present invention, in the manner described hereafter. The "Tritons" are higher molecular weight alkyl phenol polyglycol ethers, in certain cases, dimeric alkyl phenol polyglycol ethers, the higher molecular weight alkyl radical containing from 8 to 18 carbon atoms. Typical examples comprise reaction products of p-tert-octyl phenol with ethylene oxide wherein a number of oxyethylene radicals are introduced into the molecule. Among this type of non-ionic emulsifiers are products sold under the name of "Triton X–100" (iso-octyl phenol etherified with 10 to 11 mols of ethylene oxide) and "Triton X–155" (alkyl phenoxy polyethoxyethanol).

Various others of non-ionic agents useful in the practice of the present invention are, for example, those sold under a variety of other trade names as, for example, "Igepal" (alkyl phenoxy polyethoxyethanol), "Antarox A–400" (alkyl phenoxy polyethoxyethanol), "Emulphor" (fatty acid polyoxyethylene glycol ester-ethers), "Nekal RU" (fatty alcohol polyoxyethylene glycol ether), "Nonics" (dodecyl mercaptan polyoxyethylene thio-ethers), "Ethomeens" (fatty amine polyoxyethylene glycol adducts), and "Ethomids" (fatty amide polyoxyethylene glycol adducts).

Others of the non-ionic agents which fall within the scope of those usable in accordance with the present invention are, as indicated above, those sold under the trade-marks "Myrj," which is a stearic acid ester of a polyethylene glycol, and "Brij," which is a lauryl ether of a polyethylene glycol.

In general, in the non-ionic agents used herein, the polyglycol radical is ether-linked or ester-linked to a higher molecular weight radical which contains at least 8 and, most advantageously, from 12 to 22 carbon atoms. Such higher molecular weight radical can, for example, be a carboxylic acid acyl radical derived from any one, or mixtures of any two or more, of the following acids: caprylic, capric, lauric, myristic, palmitic, oleic, ricinoleic, stearic, linoleic, linolenic, said acids and others being derived or derivable from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, tall oil, castor oil, seal oils, whale oil, shark oil; waxes such as beeswax and spermaceti; partially or completely hydrogenated animal and vegetable oils such as those mentioned; carboxylic acids derived, by oxidation and other methods, from petroleum; oxidized and/or polymerized higher fatty acids or higher fatty acids derived from oxidized and/or polymerized triglyceride oils; abietic acid and rosin and resinic acids; hydroxy and alpha-hydroxy higher aliphatic and fatty acids such as i-hydroxy stearic acid, dihydroxy-stearic acid, alpha-hydroxy stearic acid, alpha-hydroxy palmitic acid, alpha-hydroxy lauric acid, alpha-hydroxy coconut oil mixed fatty acids, and the like. In general, the acids can be straight chain or branched chain and saturated or unsaturated.

In the case of the higher molecular weight ether and thioether derivatives of the polyglycols the higher molecular weight radical can be derived from alcohols and mercaptans corresponding to the above-mentioned acids as, for example, lauryl alcohol, lauryl mercaptan, oleyl alcohol, oleyl mercaptan, etc. Other sources of the higher molecular weight radicals are acylated and alkylated phenols and naphthols as, for example, diisobutyl phenol, isooctyl phenol, dodecyl phenol, p-tert-octyl phenol, octyl naphthols, undecyl-para-oxyphenylketone, tridecyl-para-oxyphenylketone, etc., said latter radicals corresponding to the formulae:

(1)              Alk—Ar—O
(2)              Ac—Ar—O where Alk is an alkyl radical containing from 4 and particularly from 8 to 18 carbon atoms, Ac is an acyl radical containing from 4 and particularly from 8 to 18 carbon atoms, and Ar is a benzene or naphthalene radical.

Typical specific examples of the first of said ingredients are:

| | |
|---|---|
| Oleic acid mono-ester of polyoxyethylene glycol | *(300) |
| Mixture of mono- and di-esters (oleic) of polyoxyethylene glycol | *(400) |
| Abietic acid mono-ester of polyoxyethylene glycol | *(600) |
| Mixed soya bean oil fatty acid mono- and di-esters of polyoxyethylene glycol | *(400) |
| Polyoxyethylene glycol ether of di-isobutyl phenol | *(300) |
| Oleic acid mono-ester of polyoxyethylene glycol | *(1000) |
| Polyoxyethylene glycol ether of para-isooctyl-phenol | *(500) |
| Polyoxyethylene glycol ether of isododecyl-phenol | *(400) |
| Polyoxyethylene glycol ether of dodecylnaphthol | *(600) |
| Polyoxyethylene glycol ether of undecyl-para-oxyphenylketone | *(400) |
| Polyoxyethylene glycol ether of iso-amyl phenol | *(400) |
| Tall oil fatty acid mono- and di-esters of polyoxyethylene glycol | *(600) |
| Rosin fatty acid mono-esters of polyoxyethylene glycol | *(400) |
| Oleyl mono-ether of polyoxyethylene glycol | *(400) |
| Polyoxyethylene glycol ether of mono-nonyl phenol | *(2000) |

* Average molecular weight of polyoxyethylene glycol from which the esters and ethers are prepared.

The second of said two essential ingredients comprises an oil soluble alkaline earth metal salt, selected from the group consisting of calcium and magnesium salts, of an alkylated benzene sulfonic acid, the alkyl radical containing from 8 to 18 carbon atoms. Especially satisfactory are the calcium salts of mono-alkylated benzene monosulfonic acids wherein the alkyl radical contains predominately from 12 to 16 carbon atoms. At least most of said compounds can be represented by the general formula $$[(Alk)_n—Ar—SO_3]_2M$$

where Alk is an alkyl radical, $n$ is an integer from 1 to 3 with the proviso that $(Alk)_n$ contains from 8 to 18 carbon atoms, Ar is a benzene radical, and M is an alkaline earth metal selected from the group consisting of calcium and magnesium.

Others of said second group of ingredients can be represented by the general formula

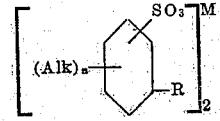

where Alk is an alkyl radical, $n$ is an integer from 1 to 3 with the proviso that $(Alk)_n$ contains from 8 to 18 carbon atoms, M is an alkaline earth metal selected from the group consisting of calcium and magnesium, and R is a member selected from the group consisting of methyl, phenyl, hydroxy-phenyl, particularly mono-hydroxy-phenyl, and hydroxyl. Although, in the above formula where R is phenyl or hydroxyl-phenyl, the Alk and SO₃M groups are shown as being present in only one of the benzene rings, the formula given is intended to encompass said compounds whether said Alk and SO₃M groups are present in the same or different benzene rings.

Typical examples of compounds falling into the category of the second of said essential ingredients are the calcium and magnesium salts of the following: di-butyl benzene monosulfonic acid; mono-lauryl phenol monosulfonic acid; dioctyl benzene monosulfonic acid; mono-nonyl phenol monosulfonic acid; mono-myristyl benzene monosulfonic acid; di-nonyl benzene monosulfonic acid; isododecyl benzene mono-sulfonic acid; mono-stearyl benzene monosulfonic acid; tri-isopropyl benzene monosulfonic acid; mono-stearyl, mono-lauryl benzene disulfonic acid; mono-octyl biphenyl monosulfonic acid; mono-lauryl mono-hydroxy biphenyl monosulfonic acid, and the like.

The higher molecular weight alkyl radical present in the alkylated benzene sulfonates can be derived from olefins, polymerized olefins, chlorinated hydrocarbons, and the like in accordance with known practices. As a general rule, the alkyl radicals will comprise mixtures having varying chain lengths and they can be selected or fractions prepared so that the desired chain length in predominate amount is present.

It will be understood that mixtures of any two or more of the ingredients of the first group may be utilized in conjunction with mixtures of any two or more of the ingredients of the second group.

Supplemental agents having solvent and coupling characteristics may be used and desirably are utilized but are not essential so far as the important features of the invention are concerned. Typical examples of such solvents and coupling agents are 2-methyl pentanediol-1,2; methyl naphthalene; xylene; and dipropylene and tripropylene glycol methyl ethers.

It should be noted that the alkali metal salts, for example, the sodium salts, of the alkylated benzene sulfonates, although heretofore known and used as emulsifying agents, are relatively ineffective when used either per se or in conjunction with the non-ionic polyglycol emulsifiers for the purposes of my present invention. It may also be noted that the aforesaid alkaline earth metal salts of the alkylated benzene sulfonates are likewise per se ineffective but, when used, in conjunction with the non-ionic polyglycol emulsifiers described above, they surprisingly act very radically to synergize the functioning of the latter emulsifiers and make possible the unusually effective results which are achieved through the practice of the present invention. These unusual results involve imparting an extremely high degree of self-dispersibility in aqueous media to the toxicant concentrates. When the aforesaid alkaline earth sulfonates are utilized as the sole emulsifier in the toxicant concentrates, or when the non-ionic polyglycol emulsifiers are utilized as the sole emulsifiers (except under certain conditions, at relatively high concentrations) in admixture with the toxicant concentrates, the latter, when added to water, normally fall through the water as oily droplets and do not tend to disperse until the system is agitated. However, when the mixture of the aforesaid alkaline earth sulfonates and the non-ionic emulsifiers is used even in relatively low concentrations in admixture with the toxicant concentrates, the latter, when added to water, disperse readily into a cloud substantially as soon as they strike the water and highly effective dispersions are obtained without any necessity for agitation. This result is of particular importance in conjunction with the use of spray equipment where little or no agitation is provided or feasible as, for example, in aeroplane spray tanks, knapsack spray tanks, and in many pieces of farm equipment, cattle dipping vats, and the like. As indicated above, although the aforesaid alkaline earth sulfonates and the non-ionic polyglycol emulsifiers are comparatively poor emulsifiers and dispersers for toxicant concentrates, a tremendous and wholly unexpected self-dispersing effect is obtained when the two are utilized in conjunction with each other.

The proportions of the ingredients can be varied within appreciable limits. Thus, for example, the first ingredient can be present in greater or lesser proportions than the second ingredient. In most cases, a ratio of 1 to 9, and particularly 3 to 7, parts of the first ingredient to 9 to 1, and particularly 7 to 3, parts of the second ingredient, said parts being by weight, is satisfactory. When used to make toxicant concentrates, the emulsifier mixture will usually range from about 5% to about 10% by weight although the proportions may range somewhat below or somewhat above that range, as hereafter more fully pointed out. In any event, it will be understood that the optimum proportions will vary, depending upon the particular toxicant or toxicant mixture utilized, upon the selection of the particular emulsifier mixture employed, and upon the aforesaid particular alkaline earth metal salt selected.

The following examples are illustrative of emulsifiers made in accordance with the invention. It will be appreciated that numerous other compositions can be made, in the light of the teachings herein, by modifications of proportions, selections of other combinations of ingredients, and the like, all within the scope of the invention as set out in the appended claims. In the examples, the numeral appearing in parentheses represents the molecular weight of the polyoxyethylene glycol. All parts listed are by weight.

Example 1

| | Parts |
|---|---|
| Mono-lauryl benzene mono-sulfonic acid, Ca salt | 7 |
| "Tween 20" | 3 |

Example 2

| | Parts |
|---|---|
| Mono-lauryl benzene monosulfonic acid, Mg salt | 3 |
| "Triton X-155" | 7 |

Example 3

| | Parts |
|---|---|
| Mono-lauryl benzene mono-sulfonic acid, Ca salt | 3 |
| "Triton X-155" | 7 |

Example 4

| | Parts |
|---|---|
| Mono-lauryl benzene mono-sulfonic acid, Ca salt | 3.5 |
| "Ethofat 242/25" (tall oil fatty acid polyoxyethylene glycol ester) | 1.5 |

Example 5

| | Parts |
|---|---|
| Mono-lauryl benzene mono-sulfonic acid, Mg salt | 3.5 |
| "Ethofat 242/25" | 1.5 |

Example 6

| | Parts |
|---|---|
| Mono-lauryl benzene mono-sulfonic acid, Ca salt | 2.5 |
| "Antarox A-400" | 2.5 |

Example 7

| | Parts |
|---|---|
| Mono-myristyl benzene monosulfonic acid, Ca salt | 3 |
| Oleic acid mono-ester of polyoxyethylene glycol (350) | 1 |

Example 8

| | Parts |
|---|---|
| Mono-lauryl phenol monosulfonic acid, Ca salt | 6 |
| Tall oil mixed mono- and di-esters of polyoxyethylene glycol (400) | 4 |

Example 9

| | Parts |
|---|---|
| Mono-cetyl phenol monosulfonic acid, Mg salt | 7 |
| Tall oil mixed mono- and di-esters of polyoxyethylene glycol (500) | 3 |

Example 10

| | Parts |
|---|---|
| Mono-lauryl benzene mono-sulfonic acid, Ca salt | 7 |
| Polyoxyethylene glycol ether of para-isooctyl phenol (500) | 3 |

Example 11

| | Parts |
|---|---|
| Mono-myristyl benzene mono-sulfonic acid, Ca salt | 6 |
| Polyoxyethylene glycol ether of undecyl-para-oxyphenylketone (400) | 4 |

Toxicant compositions or concentrates, adapted readily to produce an emulsion upon the addition of water, are formed by the incorporation with the emulsifier compositions of the desired toxicant, whether the latter be an insecticide, herbicide, plant hormone, fungicide, or the like. Such toxicant compositions advantageously contain one or more toxicants, the emulsifier proper, and an organic solvent or mixture of solvents, with or without various supplemental agents, so that all that it is necessary for the ultimate user to do is to disperse the composition in the requisite amount of water and spray or otherwise apply it to the surface to be treated. The proportions of toxicant used in such toxicant compositions are variable within wide limits although, in the usual case, the toxicant in the concentrate will range from about 20% to about 50%. The amount of organic solvent will, in general, range from about 30% to 60%, and the emulsifier composition will usually be present in proportions of about 5% to about 10%. The organic solvent or mixtures may be selected from a large group, typical examples of which are kerosene, 2-methyl pentanediol-1,2, benzene, toluene, polymethyl naphthalenes, pine oil, and the like. The dilution with water to form the emulsions for spraying or the like may likewise vary within wide limits so that, for example, ultimate emulsions may be made containing from a fraction of one per cent to several per cent, for instance, 5%, of the toxicant or mixture of toxicants.

Illustrative or typical examples of toxicant compositions falling within the scope of the invention are as follows, all parts listed being by weight:

Example 12

| | Parts |
|---|---|
| Toxaphene | 65 |
| Kerosene | 25 |
| Emulsifier of Example 1 | 10 |

While various mixing procedures may be employed, it is preferred to dissolve the toxicant (in this case toxaphene) in the solvent (in this case kerosene) and stir until the mixture is clear. The emulsifier is then added and stirred until clear. In use, the desired or requisite amount of toxicant concentrate is poured into the predetermined amount of water and the resulting emulsion is then ready for application to the surfaces to be treated by spraying or in any other desired manner.

The compositions of the following examples are made up in like manner to Example 14 and made into emulsions with water in similar fashion.

Example 13

| | Parts |
|---|---|
| DDT | 20 |
| Xylene | 75 |
| Emulsifier of Example 2 | 5 |

Example 14

| | Parts |
|---|---|
| Chlordane | 60 |
| Kerosene | 30 |
| Emulsifier of Example 1 | 10 |

Example 15

| | Parts |
|---|---|
| Toxaphene | 50 |
| Kerosene | 40 |
| Emulsifier of Example 4 | 10 |

Example 16

| | Parts |
|---|---|
| Toxaphene | 35 |
| DDT | 35 |
| Xylene | 70 |
| Emulsifier of Example 6 | 10 |

Example 17

| | Parts |
|---|---|
| Toxaphene | 57 |
| Kerosene | 33 |
| Emulsifier of Example 3 | 10 |

Example 18

| | Parts |
|---|---|
| DDT | 25 |
| Velsicol AR 50 (Polymethyl naphthalene aromatic solvent) | 70 |
| Emulsifier of Example 4 | 5 |

Example 19

| | Parts |
|---|---|
| Benzene hexachloride | 25 |
| Xylene | 65 |
| Emulsifier of Example 6 | 10 |

Example 20

| | Parts |
|---|---|
| Toxaphene | 64 |
| Kerosene | 26 |
| Emulsifier of Example 11 | 10 |

The pH of the emulsifier, when dispersed in water, should ordinarily range from about 5 to about 8, particularly desirable results being obtained in most cases at a pH of about 6. The pH is adjusted to the desired value, in the manufacture of thhe alkylated benzene sulfonate during the neutralization step, by controlling the amount of the aforesaid alkaline earth metal oxide or hydroxide added to the alkylated benzene sulfonic acid.

The emulsifiers, as described above, have especial utility for the preparation of emulsions for agricultural and livestock purposes, but it will be understood that their utility extends to other fields where emulsions of oleaginous and aqueous materials are desired.

While the invention has been described in detail, no unnecessary limitations should by reason thereof be inferred, and it should be understood that the scope of the invention is not to be limited thereby but is pointed out in the appended claims.

This application is a continuation-in-part of application Serial No. 230,087, filed June 5, 1951, now abandoned.

What is claimed as new and desired to protect by Letters Patent of the United States is:

1. An agricultural and livestock composition for use in conjunction with organic solvent solutions of water-insoluble toxicants, which, upon the addition thereof to soft as well as hard waters, forms a fine dispersion therein of said toxicants, said composition containing (a) at least one member selected from the group consisting of higher molecular weight ethers and thioethers of polyoxyalkylene glycols and higher molecular weight carboxylic acid esters of polyoxyalkylene glycols, the higher molecular weight radicals containing from 8 to 22 carbon atoms and the polyoxyalkylene glycol radical having a molecular weight between about 200 and 6000, the polyoxyalkylene glycol being selected from the group consisting of polyoxyethylene glycols and polyoxypropylene glycols, and (b) an oil-soluble compound corresponding to the formula

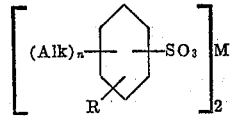

where Alk is an alkyl radical, $n$ is an integer from 1 to 3 with the proviso that $(Alk)_n$ contains from 8 to 18 carbon atoms, R is a member selected from the group consisting of methyl, phenyl, hydroxy-phenyl and hydroxyl, and M is an alkaline earth metal selected from the group consisting of calcium and magnesium, said ingredient (a) and said ingredient (b) being present in proportions to each other ranging from about 9 to 1 to about 1 to 9.

2. A composition in accordance with claim 1, wherein said ingredient (b) is a calcium salt of an alkyl benzene monosulfonate, the alkyl radical containing from 8 to 18 carbon atoms.

3. An agricultural and livestock composition for use in conjunction with organic solvent solutions of water-insoluble toxicants, which, upon the addition thereof to soft as well as hard waters, forms a fine dispersion therein of said toxicants, said composition containing (a) at least one member selected from the group consisting of water-soluble to water-dispersible higher molecular weight alkyl ethers and thioethers of polyoxyethylene glycols and higher molecular weight aliphatic carboxylic acid esters of polyoxyethylene glycols, the higher molecular weight alkyl and aliphatic carboxylic acid radicals containing from 12 to 22 carbon atoms and the polyoxyethylene glycol radical having a molecular weight between about 200 and 6000, and (b) an oil-soluble alkaline earth metal salt of an alkyl benzene sulfonate wherein the alkyl radical contains from 12 to 16 carbon atoms and wherein said alkaline earth metal is selected from the group consisting of calcium and magnesium, said ingredient (a) and said ingredient (b) being present in proportions to each other ranging from about 9 to 1 to about 1 to 9.

4. An agricultural and livestock composition for use in conjunction with organic solvent solutions of water-insoluble toxicants, which, upon the addition thereof to soft as well as hard waters, forms a fine dispersion therein of said toxicants, said composition containing (a) a higher molecular weight fatty acid ester of a polyoxyethylene glycol, the higher molecular weight fatty acid radical containing from 12 to 22 carbon atoms and the polyoxyethylene glycol radical having a molecular weight between about 200 and 6000, and (b) an oil-soluble compound corresponding to the formula

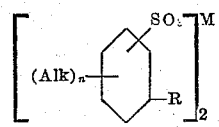

where Alk is an alkyl radical, $n$ is an integer from 1 to 3 with the proviso that $(Alk)_n$ contains from 8 to 18 carbon atoms, M is an alkaline earth metal, selected from the group consisting of calcium and magnesium, and R is a member selected from the group consisting of methyl, phenyl, hydroxy-phenyl and hydroxyl, said ingredient (a) and said ingredient (b) being present in proportions to each other ranging from about 9 to 1 to about 1 to 9.

5. An agricultural and livestock composition for use in conjunction with organic solvent solutions of water-insoluble toxicants, which, upon the addition thereof to soft as well as hard waters, forms a fine dispersion therein of said toxicants, said composition containing (a) a higher molecular weight fatty acid ester of polyoxyethylene glycol ether of a sugar alcohol of the class consisting of mannitan and sorbitan, the higher molecular weight fatty acid radical containing from 12 to 22 carbon atoms and the polyoxyethylene glycol radical having a molecular weight between about 200 and 6000, and (b) an oil-soluble compound corresponding to the formula

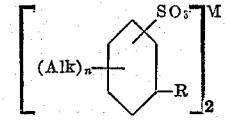

where Alk is an alkyl radical, $n$ is an integer from 1 to 3 with the proviso that $(Alk)_n$ contains from 8 to 18 carbon atoms, M is an alkaline earth metal selected from the group consisting of calcium and magnesium, and R is a member selected from the group consisting of methyl, phenyl, hydroxy-phenyl and hydroxyl, said ingredient (a) and said ingredient (b) being present in proportions to each other ranging from about 9 to 1 to about 1 to 9.

6. An agricultural and livestock composition for use in conjunction with organic solvent solutions of water-insoluble toxicants, which, upon the addition thereof to soft as well as hard waters, forms a fine dispersion therein of said toxicants, said composition containing (a) an alkyl phenol polyoxyethylene glycol ether, the alkyl radical containing from 8 to 18 carbon atoms and the polyoxyethylene glycol radical having a molecular weight between about 300 and 600, and (b) an oil-soluble compound corresponding to the formula

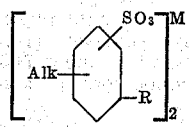

where Alk is an alkyl radical containing from 8 to 18 carbon atoms, M is an alkaline earth metal selected from the group consisting of calcium and magnesium, and R is a member selected from the group consisting of methyl, phenyl, hydroxy-phenyl and hydroxyl, said ingredient (a) and said ingredient (b) being present in proportions to each other ranging from about 9 to 1 to about 1 to 9.

7. An agricultural and livestock composition for use in conjunction with organic solvent solutions of water-insoluble toxicants, which, upon the addition thereof to soft as well as hard waters, forms a fine dispersion therein of said toxicants, said composition containing (a) a non-ionic emulsifier in the form of a normally liquid water-soluble to water-dispersible compound having a polyoxyethylene glycol radical containing from 4 to 60 ethenoxy groups linked to a higher molecular weight radical containing from 8 to 22 carbon atoms, and (b) an oil-soluble compound corresponding to the formula

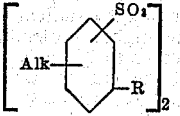

where Alk is an alkyl radical containing from 8 to 18 carbon atoms, and M is an alkaline earth metal selected from the group consisting of calcium and magnesium, and R is a member selected from the group consisting of methyl, phenyl, hydroxy-phenyl and hydroxyl, said ingredient (a) and said ingredient (b) being present in proportions to each other ranging from about 9 to 1 to about 1 to 9.

8. An agricultural and livestock composition for use in conjunction with organic solvent solutions of water-insoluble toxicants, which, upon the addition thereof to soft as well as hard waters, forms a fine dispersion therein of said toxicants, said composition containing (a) a non-ionic emulsifier in the form of a water-soluble to water-dispersible compound having a polyoxyalkylene glycol radical containing from 4 to 60 oxyalkylene groups linked to a higher molecular weight radical containing from 8 to 22 carbon atoms, said oxyalkylene groups being selected from the class consisting of oxyethylene groups and oxypropylene groups, and (b) an oil-soluble compound corresponding to the formula

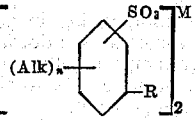

where Alk is an alkyl radical, n is an integer from 1 to 3 with the proviso that (Alk)$_n$ contains from 8 to 18 carbon atoms, R is a member selected from the group consisting of methyl, phenyl, hydroxyphenyl and hydroxyl, and M is an alkaline earth metal selected from the group consisting of calcium and magnesium, said ingredient (a) and said ingredient (b) being present in proportions to each other ranging from about 9 to 1 to about 1 to 9.

9. An agricultural and livestock composition for use in conjunction with organic solvent solutions of water-insoluble toxicants, which, upon the addition thereof to soft as well as hard waters, forms a fine dispersion therein of said toxicants, said composition containing (a) a non-ionic emulsifier in the form of a water-soluble to water-dispersible compound having a polyoxyalkylene glycol radical containing from 4 to 60 oxyalkylene groups linked to a higher molecular weight radical containing from 8 to 22 carbon atoms, said oxyalkylene groups being selected from the class consisting of oxyethylene groups and oxypropylene groups, and (b) an oil-soluble compound corresponding to the formula

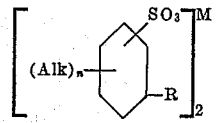

where Alk is an alkyl radical, n is an integer from 1 to 3 with the proviso that (Alk)$_n$ contains from 8 to 18 carbon atoms, and M is an alkaline earth metal selected from the group consisting of calcium and magnesium, and R is a member selected from the group consisting of methyl, phenyl, hydroxy-phenyl and hydroxyl, said ingredient (a) and said ingredient (b) being present in proportions to each other ranging from about 9 to 1 to about 1 to 9.

10. An agricultural and livestock composition for use in conjunction with organic solvent solutions of water-insoluble toxicants, which, upon the addition thereof to soft as well as hard waters, forms a fine dispersion therein of said toxicants, said composition containing (a) a non-ionic emulsifier in the form of a water-soluble to water-dispersible compound having a polyoxyalkylene glycol radical containing from 4 to 60 alkylene groups linked to a higher molecular weight radical containing from 12 to 22 carbon atoms, said oxyalkylene groups being selected from the class consisting of oxyethylene groups and oxypropylene groups, and (b) an oil-soluble compound corresponding to the formula

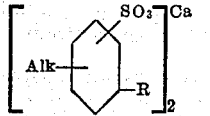

where Alk is an alkyl radical containing predominantly from 12 to 16 carbon atoms, and R is a member selected from the group consisting of methyl, phenyl, hydroxyphenyl and hydroxyl, said ingredient (a) and said ingredient (b) being present in proportions to each other ranging from about 9 to 1 to about 1 to 9.

11. A composition in accordance with claim 10, wherein said ingredient (a) and said ingredient (b) are present in proportions to each other ranging from about 3 to 1 to about 1 to 3.

12. An agricultural and livestock composition for use in conjunction with organic solvent solutions of water-insoluble toxicants, which, upon the addition thereof to soft as well as hard waters, forms a fine dispersion therein of said toxicants, said composition containing (a) a non-ionic emulsifier in the form of a water-soluble to water-dispersible compound having a polyoxyalkylene radical containing from 4 to 60 oxyalkylene groups linked to a higher molecular weight radical containing from 8 to 22 carbon atoms, said oxyalkylene groups being selected from the class consisting of oxyethylene and oxypropylene groups, and (b) an oil-soluble compound corresponding to the formula

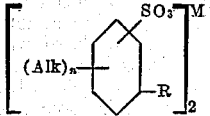

where Alk is an alkyl radical, n is an integer from 1 to 3 with the proviso that (Alk)$_n$ contains from 8 to 18 carbon atoms, M is an alkaline earth metal selected from the group consisting of calcium and magnesium, and R is a member selected from the group consisting of methyl, phenyl, hydroxy-phenyl and hydroxyl, said ingredient (a) and said ingredient (b) being present in proportions to each other ranging from about 9 to 1 to about 1 to 9.

13. An agricultural and livestock composition for use in conjunction with organic solvent solutions of water-insoluble toxicants, which, upon the addition thereof to soft as well as hard waters, forms a fine dispersion therein of said toxicants, said composition containing (a) a water-soluble to water-dispersible polyoxyethylene glycol ether of an acylated phenol in which the acyl radical contains from 8 to 18 carbon atoms and in which the polyoxyethylene radical has a molecular weight from about 200 to 6000, and (b) an oil-soluble compound corresponding to the formula

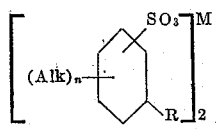

where Alk is an alkyl radical, n is an integer from 1 to 3 with the proviso that (Alk)n contains from 8 to 18 carbon atoms, R is a member selected from the group consisting of methyl, phenyl, hydroxy-phenyl and hydroxyl, and M is an alkaline earth metal selected from the group consisting of calcium and magnesium, said ingredient (a) and said ingredient (b) being present in proportions to each other ranging from about 9 to 1 to about 1 to 9.

14. An agricultural and livestock composition for use in conjunction with organic solvent solutions of water-insoluble toxicants, which, upon the addition thereof to soft as well as hard waters, forms a fine dispersion therein of said toxicants, said composition containing (a) a non-ionic emulsifier in the form of a water-soluble to water-dispersible compound having a polyoxyethylene radical containing from about 8 to about 20 oxyethylene groups linked to a higher molecular weight radical containing from 8 to 22 carbon atoms, and (b) an oil-soluble alkaline earth metal salt of an alkylated benzene sulfonate in which the alkyl radical contains from 8 to 18 carbon atoms, the alkaline earth metal being selected from the group consisting of calcium and magnesium, said ingredient (a) and said ingredient (b) being present in proportions to each other ranging from about 9 to 1 to about 1 to 9.

15. A toxicant composition, adapted readily, upon the addition to soft as well as hard waters, to form a fine dispersion of the toxicant in said water, said composition containing at least one organic solvent-soluble water-insoluble toxicant, an organic solvent for said toxicant, (a) a non-ionic emulsifier in the form of a water-soluble to water-dispersible compound having a polyoxyalkylene glycol radical containing from 4 to 60 oxyalkylene groups linked to a higher molecular weight radical containing from 8 to 22 carbon atoms, said oxyalkylene groups being selected from the class consisting of oxyethylene and oxypropylene groups, and (b) an oil-soluble compound corresponding to the formula

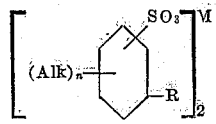

where Alk is an alkyl radical, n is an integer from 1 to 3 with the proviso that (Alk)n contains from 8 to 18 carbon atoms, M is an alkaline earth metal selected from the group consisting of calcium and magnesium, and R is a member selected from the group consisting of methyl, phenyl, hydroxy-phenyl and hydroxyl, said ingredient (a) and said ingredient (b) being present in proportions to each other ranging from about 9 to 1 to about 1 to 9.

16. A toxicant composition adapted readily, upon the addition to soft as well as hard waters, to form a fine dispersion of the toxicant in said water, said composition containing at least one organic solvent-soluble water-insoluble toxicant, an organic solvent for said toxicant, (a) a non-ionic emulsifier in the form of a water-soluble to water-dispersible compound having a polyoxyethylene radical containing from about 8 to about 20 ethenoxy groups linked to a higher molecular weight radical containing from 12 to 22 carbon atoms, and (b) an oil-soluble compound corresponding to the formula

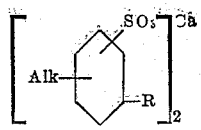

where Alk is an alkyl radical containing predominately from 12 to 16 carbon atoms, and R is a member selected from the group consisting of methyl, phenyl, hydroxy-phenyl and hydroxyl, said ingredient (a) and said ingredient (b) being present in proportions to each other ranging from about 9 to 1 to about 1 to 9.

17. A toxicant composition, adapted readily, upon the addition to soft as well as hard waters, to form a fine dispersion of the toxicant in said water, said composition containing at least one organic solvent-soluble water-insoluble toxicant, an organic solvent for said toxicant, (a) a non-ionic emulsifier in the form of a higher molecular weight ether of a polyoxyethylene glycol, the higher molecular weight radical containing from 8 to 22 carbon atoms and the polyoxyethylene glycol radical having a molecular weight between about 300 and 600, and (b) an oil-soluble compound corresponding to the formula

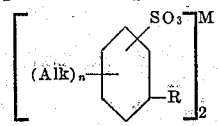

where Alk is an alkyl radical, n is an integer from 1 to 3 with the proviso that (Alk)n contains from 8 to 18 carbon atoms, R is a member selected from the group consisting of methyl, phenyl, hydroxy-phenyl and hydroxyl, and M is an alkaline earth metal selected from the group consisting of calcium and magnesium, said ingredient (a) and said ingredient (b) being present in proportions to each other ranging from about 9 to 1 to about 1 to 9.

18. A toxicant composition, adapted readily, upon the addition to soft as well as hard waters, to form a fine dispersion of the toxicant in said water, said composition containing at least one organic solvent-soluble water-insoluble toxicant, an organic solvent for said toxicant, (a) at least one non-ionic emulsifying agent in the form of a water-soluble to water-dispersible compound having a higher molecular weight radical linked to a polyoxyethylene glycol, the higher molecular weight radical of which contains from 12 to 22 carbon atoms and the polyoxyethylene glycol radical of which has a molecular weight between about 300 and 600, and (b) an oil-soluble compound corresponding to the formula

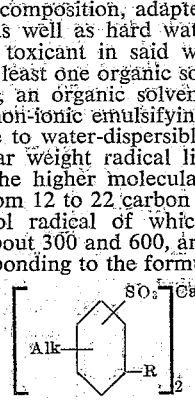

where Alk is an alkyl radical containing predominately from 12 to 16 carbon atoms, and R is a member selected from the group consisting of methyl, phenyl, hydroxy-phenyl and hydroxyl, said ingredient (a) and said ingredient (b) being present in proportions to each other ranging from about 3 to 1 to about 1 to 3.

19. A toxicant composition in accordance with claim 18, wherein the toxicant is toxaphene, and wherein the (a) and (b) ingredients together are present in proportions in the range of about 5% to about 10%, by weight, of said toxicant composition.

20. A toxicant composition in accordance with claim 18, wherein the toxicant is DDT, and wherein the (a) and (b) ingredients together are present in proportions in the range of about 5% to about 10%, by weight, of said toxicant composition.

21. A toxicant composition in accordance with claim 18, wherein the toxicant is chlordane, and wherein the (a) and (b) ingredients together are present in proportions in the range of about 5% to about 10%, by weight, of said toxicant composition.

22. A toxicant composition in accordance with claim 18, wherein the toxicant is "Aldrin," and wherein the (a) and (b) ingredients together are present in proportions in the range of about 5% to about 10%, by weight, of said toxicant composition.

23. A toxicant composition in accordance with claim 18, wherein the toxicant is "Lindane," and wherein the (a) and (b) ingredients together are present in proportions in the range of about 5% to about 10%, by weight, of said toxicant composition.

24. A toxicant composition, adapted readily, upon the addition to soft as well as hard waters, to form a fine dispersion of the toxicant in said water, said composition containing at least one organic solvent-soluble water-insoluble toxicant, an organic solvent for said toxicant, (a) a non-ionic emulsifier in the form of a water-soluble to water-dispersible compound having a polyoxyalkylene radical containing from 4 to 60 oxyalkylene groups linked to a higher molecular weight radical containing from 8 to 22 carbon atoms, said oxyalkylene groups being selected from the class consisting of oxyethylene and oxypropylene groups, and (b) an oil-soluble compound corresponding to the formula

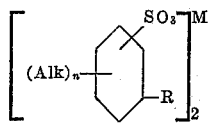

where Alk is an alkyl radical, $n$ is an integer from 1 to 3 with the proviso that $(Alk)_n$ contains from 8 to 18 carbon atoms, M is an alkaline earth metal selected from the group consisting of calcium and magnesium, and R is a member selected from the group consisting of methyl, phenyl, hydroxy-phenyl and hydroxyl, said ingredient (a) and said ingredient (b) being present in proportions to each other ranging from about 9 to 1 to about 1 to 9.

References Cited in the file of this patent

UNITED STATES PATENTS

| Number | Name | Date |
|---|---|---|
| 2,283,199 | Flett | May 19, 1942 |
| 2,447,475 | Kaberg | Aug. 17, 1948 |
| 2,509,233 | Kaberg | May 30, 1950 |
| 2,552,187 | Kosmin | May 8, 1951 |
| 2,588,318 | Benignus | Mar. 4, 1952 |

OTHER REFERENCES

Amer. Dyes Reporter for Dec. 11, 1950, pp. P888–P890 inclusive (article by Robinette).